(12) United States Patent
Wang et al.

(10) Patent No.: US 12,375,687 B2
(45) Date of Patent: Jul. 29, 2025

(54) SIGN PREDICTION FOR MULTIPLE COLOR COMPONENTS IN VIDEO CODING

(71) Applicant: QUALCOMM Incorporated, San Diego, CA (US)

(72) Inventors: Hongtao Wang, San Diego, CA (US); Jianle Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 18/335,757

(22) Filed: Jun. 15, 2023

(65) Prior Publication Data

US 2023/0328255 A1    Oct. 12, 2023

Related U.S. Application Data

(63) Continuation of application No. 17/645,439, filed on Dec. 21, 2021, now Pat. No. 11,722,675.

(60) Provisional application No. 63/131,615, filed on Dec. 29, 2020.

(51) Int. Cl.
| | |
|---|---|
| *H04N 19/186* | (2014.01) |
| *H04N 19/146* | (2014.01) |
| *H04N 19/176* | (2014.01) |
| *H04N 19/46* | (2014.01) |

(52) U.S. Cl.
CPC ......... *H04N 19/146* (2014.11); *H04N 19/176* (2014.11); *H04N 19/186* (2014.11); *H04N 19/46* (2014.11)

(58) Field of Classification Search
CPC .... H04N 19/46; H04N 19/146; H04N 19/176; H04N 19/186
USPC ...................................................... 375/240.02
See application file for complete search history.

(56) References Cited

U.S. PATENT DOCUMENTS

| | | |
|---|---|---|
| 2019/0208225 A1 | 7/2019 | Chen et al. |
| 2020/0267388 A1 | 8/2020 | Lainema |
| 2021/0058643 A1 | 2/2021 | Zhao et al. |
| 2021/0306666 A1* | 9/2021 | Lee .................... H04N 19/46 |

(Continued)

OTHER PUBLICATIONS

Abdoli M., et al., "Non-CE3: Decoder-Side Intra Mode Derivation (DIMD) with Prediction Fusion Using Planar", 15. JVET Meeting, Jul. 3, 2019-Jul. 12, 2019, Gothenburg, (The Joint Video Exploration Team of ISO/IEC JTC1/SC29/WG11 and ITU-TSG.16), No. JVET-O0449-V2, m48570, Jul. 4, 2019, XP030219611, XP030219610, abstract, figures 1-3, paragraphs [0001], [0002], [8.4.2], pp. 1-9.

(Continued)

*Primary Examiner* — Albert Kir
(74) *Attorney, Agent, or Firm* — Shumaker & Sieffert, P.A.

(57) ABSTRACT

An example method includes predicting, based on a plurality of color components of a block of video data coded using joint coding of chroma residuals (JCCR), a sign of a coefficient of a plurality of coefficients of a joint residual block of the block of video data; generating, for each respective color component of the plurality of color components and based on the plurality of coefficients of the joint residual block, coefficients of a respective residual block of a plurality of residual blocks; and reconstructing, based on the plurality of residual blocks, the block of video data.

31 Claims, 9 Drawing Sheets

(56) References Cited

U.S. PATENT DOCUMENTS

| | | | |
|---|---|---|---|
| 2022/0046232 A1* | 2/2022 | Piao | H04N 19/105 |
| 2022/0210434 A1 | 6/2022 | Wang | |
| 2022/0210481 A1* | 6/2022 | Fan | H04N 19/103 |
| 2022/0247997 A1 | 8/2022 | Abe et al. | |
| 2022/0264087 A1 | 8/2022 | Zhang et al. | |
| 2022/0264122 A1 | 8/2022 | Zhu et al. | |
| 2022/0353505 A1* | 11/2022 | Kim | H04N 19/186 |
| 2022/0377324 A1* | 11/2022 | Yang | H04N 19/117 |
| 2023/0308664 A1* | 9/2023 | Zhao | H04N 19/1887 |

OTHER PUBLICATIONS

Bossen F., et al., "Guidelines for VVC Reference Software Development", Joint Video Experts Team (JVET) of ITU-T SG16 WP3 and ISO/IEC JTC1/SC29/WG11, 14th Meeting: Geneva, CH, Mar. 19-27, 2019, JVET-N1003, pp. 1-8.
Bossen F., et al., "VTM Common Test Conditions and Software Reference Configurations for SDR Video", JVET-T2010-v1, Joint Video Experts Team (JVET) of ITU-T SG 16 WP 3 and ISO/IEC JTC 1/SC 29, 20th Meeting, by teleconference, Oct. 7-16, 2020, pp. 1-7.
Bross B., et al., "Versatile Video Coding (Draft 10)", JVET-S2001-vA, Joint Video Experts Team (JVET) of ITU-T SG 16 WP 3 and ISO/IEC JTC 1/SC 29/WG 11, 19th Meeting: by Teleconference, Jun. 22-Jul. 1, 2020, 550 Pages.
Chang Y-J., et al., "Compression Efficiency Methods Beyond VVC", JVET-U0100, Joint Video Experts Team (JVET) of ITU-T SG 16 WP 3 and ISO/IEC JTC 1/SC 29, 21st Meeting, by Teleconference, Jan. 6-15, 2021, XP030293237, pp. 1-13, sections 3.2 and 3.3.
Chen J., et al., "Algorithm Description of Joint Exploration Test Model 3", Document: JVET-C1001_v3, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 37 Pages, Jul. 6, 2016, section 2-2.2.1.
Chen Y., et al., "Description of SDR, HDR and 360° Video Coding Technology Proposal by Qualcomm and Technicolor—Low and High Complexity Versions", JVET-J0021, Joint Video Exploration Team (JVET) of ITU-T SG 16 WP 3 and ISO/IEC JTC 1/SC 29/WG 11, 10th Meeting: San Diego, US, Apr. 10-20, 2018, pp. 1-42.
Han Y., et al., "CE4.4.6: Improvement on Merge/Skip Mode," JVET-L0399_r2, Joint Video Exploration Team (JVET) of ITU-T SG 16 WP 3 and ISO/IEC JTC 1/SC 29/WG 11, JVET-L0399, 12th Meeting: Macao, CN, Oct. 3-12, 2018, pp. 1-6.
Henry F., et al., "Residual Coefficient Sign Prediction", 4th JVET Meeting, Oct. 15, 2016-Oct. 21, 2016, Chengdu, (The Joint Video Exploration Team of ISO/IEC JTC1/SC29/WG11 and ITU-T SG.16 WP 3), No. JVET-D0031, Oct. 20, 2016 (Oct. 20, 2016), JVET-D0031-v2, JVET-D0031-v4, XP030150258, pp. 1-6, section 2. 2, section 2. 3, section 2. 4, section 2.4.

International Search Report and Written Opinion—PCT/US2021/064890—ISA/EPO—Apr. 22, 20202, 13 Pages.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
Kuo C-W (Kuaishou)., et al., "AHG9: On Signaling the JCCR Sign Information in PH", 131. MPEG Meeting, Jun. 29, 2020-Jul. 3, 2020, Online, (Motion Picture Expert Group or ISO/IEC JTC1/SC29/WG11), No. m54209, JVET-S0201, Jun. 11, 2020, 3 Pages, XP030288423.
Lainema J., "CE7: Joint Coding of Chrominance Residuals (CE7-1)", Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0054, Mar. 12, 2019, pp. 1-5, XP030254461.
Ray B (Qualcomm)., et al., "Unified PDPC for Angular Intra Modes", JVET-Q0391-v3, Joint Video Experts Team (JVET) of ITU-T SG 16 WP 3 and ISO/IEC JTC 1/SC 29/WG 11, 17th Meeting, Brussels, BE, Jan. 7-17, 2020, Jan. 8, 2020 (Jan. 8, 2020), m51986, XP030223398, pp. 1-7, Sections 1, 2, 4, p. 1-p. 3, Figures 1-3.
Schwarz H., et al., "Additional Support of Dependent Quantization with 8 States", JVET-Q0243-v2, Joint Video Experts Team (JVET) of ITU-T SG 16 WP 3 and ISO/IEC JTC 1/SC 29/WG 11, 17th Meeting: Brussels, BE, Jan. 7-17, 2020, pp. 1-12.
Seregin V., et al., "Block Shape Dependent Intra Mode Coding", 4th Jvet Meeting, Chengdu, (The Joint Video Exploration Team of ISO/IEC JTC1/SC29/WG11 and ITU-T SG.16 WP 3), JVET-D0114r1, URL: http://phenix.int-evry.fr/jvet/, CN, Oct. 15-21, 2016, 3 pages.
Seregin V., et al., "CE4-3.1a and CE4-3.1b: Unidirectional Local Illumination Compensation with Affine Prediction", JVET-O0066-v1, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-5.
Winken M., et al., "CE10: Multi-Hypothesis Inter Prediction (Test 10.1.2)", JVET-M0425-v2, Joint Video Experts Team (JVET) of ITU-T SG 16 WP 3 and ISO/IEC JTC 1/SC 29/WG 11, 13th Meeting: Marrakech, MA, Jan. 9-18, 2019, XP030200865, pp. 1-14.
Zhang K., et al., "Enhanced Cross-Component Linear Model Intra-Prediction", JVET-D0110, Joint Video Exploration Team (JVET) of ITU-T SG 16 WP 3 and ISO/IEC JTC 1/SC 29/WG 11, 4th Meeting: Chengdu, CN, Oct. 15-21, 2016, JVET-D0110-v3, pp. 1-6.
Zhao X., et al., "Six Tap Intra Interpolation Filter," JVET Meeting, (The Joint Video Exploration Team (JVET) of ITU-T SG 16 WP 3 and ISO/IEC JTC 1/SC 29/WG 11), 4th Meeting, Chengdu, CN, Oct. 15-21, 2016, No. JVET-D0119r1, pp. 1-3.
Prosecution History from U.S. Appl. No. 17/645,439, dated Oct. 5, 2022 through Jun. 14, 2023, 36 pp.

* cited by examiner

SIGN PREDICTION FOR MULTIPLE COLOR COMPONENTS IN VIDEO CODING

This application is a continuation of U.S. patent application Ser. No. 17/645,439, filed Dec. 21, 2021, which claims the benefit of U.S. Provisional Application No. 63/131,615, filed Dec. 29, 2020, the entire contents of each of which are incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for coding video data using sign prediction performed based on multiple color components of the video data. To predict a sign value for a coefficient of a plurality of coefficients of a transform block, a video coder (e.g., a video encoder and/or a video decoder) may reconstruct the transform block using both positive value and negative value for the sign value of the coefficient. Each block reconstruction using a candidate sign value may be referred to as a hypothesis reconstruction. The video coder may evaluate the two hypothesis reconstructions for the sign of the coefficient with a cost function, and select the hypothesis reconstruction which minimizes the cost function gives the predicted sign value for the coefficient of the transform block. However, in some examples, multiple blocks may be impacted by the predicted sign value. For instance, where the transform block is a joint coding of chroma residuals (JCCR) transform block from which the video coder generates a plurality of transform blocks that each correspond to a different color component, the plurality of transform blocks may all be impacted by the predicted sign value. Performing sign prediction based on only one color component may be sub-optimal, as one hypothesis reconstruction may work well for one color component but work poorly for others.

In accordance with one or more techniques of this disclosure, a video coder (e.g., a video encoder and/or a video decoder) may perform sign prediction based on a plurality of color components of the video data. For instance, when performing sign prediction on a JCCR transform block that is used to generate a plurality of transform blocks that each correspond to a different color component (e.g., a Cb transform block and a Cr transform block), the video coder may perform the sign prediction based on the plurality of color components. By performing sign prediction based on multiple color components, the techniques of this disclosure may improve sign prediction. Improved sign prediction may reduce a number of bits needed to signal signs. In this way, the techniques of this disclosure may improve coding efficiency.

In one example, a method of decoding video data includes predicting, based on a plurality of color components of a block of video data coded using JCCR, a sign of a coefficient of a plurality of coefficients of a joint residual block of the block of video data; generating, for each respective color component of the plurality of color components and based on the plurality of coefficients of the joint residual block, coefficients of a respective residual block of a plurality of residual blocks; and reconstructing, based on the plurality of residual blocks, the block of video data.

In another example, a method of encoding video data includes predicting, based on a plurality of color components of a block of video data coded using JCCR, a sign of a coefficient of a plurality of coefficients of a joint residual block of the block of video data; generating, for each respective color component of the plurality of color components and based on the plurality of coefficients of the joint residual block, coefficients of a respective residual block of a plurality of residual blocks; and reconstructing, based on the plurality of residual blocks, the block of video data.

In another example, a device for coding video data includes means for predicting, based on a plurality of color components of a block of video data coded using JCCR, a sign of a coefficient of a plurality of coefficients of a joint residual block of the block of video data; means for generating, for each respective color component of the plurality of color components and based on the plurality of coefficients of the joint residual block, coefficients of a respective residual block of a plurality of residual blocks; and means for reconstructing, based on the plurality of residual blocks, the block of video data.

In another example, a computer-readable storage medium stores instructions that, when executed, cause one or more processors of a video coder to: predict, based on a plurality of color components of a block of video data coded using JCCR) a sign of a coefficient of a plurality of coefficients of a joint residual block of the block of video data; generate, for each respective color component of the plurality of color components and based on the plurality of coefficients of the joint residual block, coefficients of a respective residual block of a plurality of residual blocks; and reconstruct, based on the plurality of residual blocks, the block of video data.

The details of one or more examples are set forth in the accompanying drawings and the description below. Other features, objects, and advantages will be apparent from the description, drawings, and claims.

DETAILED DESCRIPTION

In general, this disclosure describes techniques for coding video data using sign prediction performed based on multiple color components of the video data. To predict a sign value for a coefficient of a plurality of coefficients of a transform block, a video coder (e.g., a video encoder and/or a video decoder) may reconstruct the transform block using both positive value and negative value for the sign value of the coefficient. Each block reconstruction using a candidate sign value may be referred to as a hypothesis reconstruction. The video coder may evaluate the two hypothesis reconstructions for the sign of the coefficient with a cost function, and select the hypothesis reconstruction which minimizes the cost function gives the predicted sign value for the coefficient of the transform block. However, in some examples, multiple blocks may be impacted by the predicted sign value. For instance, where the transform block is a joint coding of chroma residuals (JCCR) transform block from which the video coder generates a plurality of transform blocks that each correspond to a different color component, the plurality of transform blocks may all be impacted by the predicted sign value. Performing sign prediction based on only one color component may be sub-optimal, as one hypothesis reconstruction may work well for one color component but work poorly for others.

In accordance with one or more techniques of this disclosure, a video coder (e.g., a video encoder and/or a video decoder) may perform sign prediction based on a plurality of color components of the video data. For instance, when performing sign prediction on a JCCR transform block that is used to generate a plurality of transform blocks that each correspond to a different color component (e.g., a Cb transform block and a Cr transform block), the video coder may perform the sign prediction based on the plurality of color components. By performing sign prediction based on multiple color components, the techniques of this disclosure may improve sign prediction. Improved sign prediction may reduce a number of bits needed to signal signs. In this way, the techniques of this disclosure may improve coding efficiency.

Figure 1:
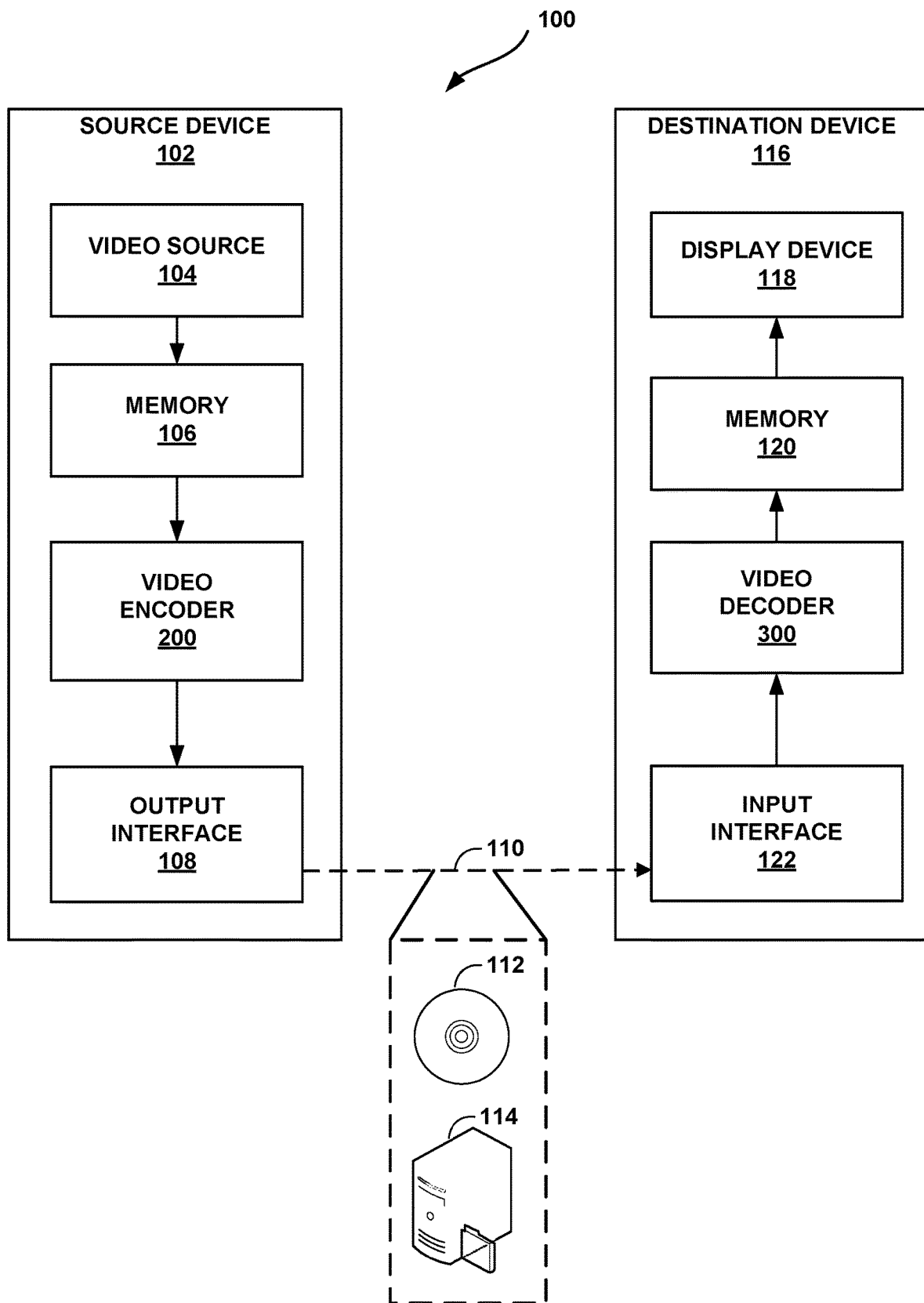
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for sign prediction for multiple color components. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for sign prediction for multiple color components. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 10)," Joint Video Experts Team (JVET) of ITU-T SG 16 WP 3 and ISO/IEC JTC 1/SC 29/WG 11, 18$^{th}$ Meeting: by teleconference, 22 Jun.-1 Jul. 2020, JVET-S2001-vA (hereinafter "VVC Draft 10"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

Figure 5:
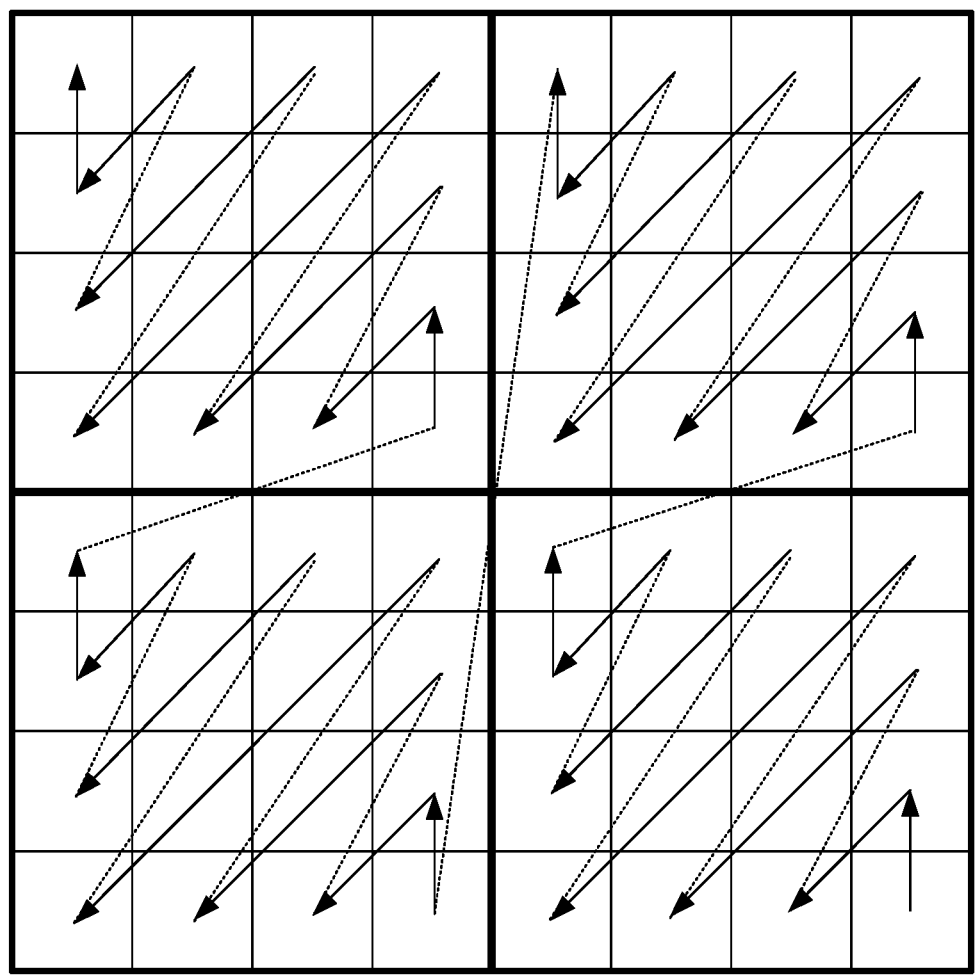
FIG. 5 is a conceptual diagram illustrating the coefficient scan for an 8×8 transform block containing 4 coefficient groups in HEVC.

As discussed above, video encoder 200 may encode and video decoder 300 may decode transform coefficients. For instance, to perform transform coefficient coding in accordance with HEVC, a video coder (e.g., video encoder 200 and/or video decoder 300) may divide the transform coefficient block (TB) by coefficient groups (CGs) where each CG may represent a 4×4 sub-block. As one example, a 32×32 TU may be divided into a total of 64 CGs, and a 16×16 TU may be divided into a total of 16 CGs. The video coder may perform entropy coding of the TB in unit of CG. The video coder may code the CGs inside a TB according to a given scan order. When coding each CG, the video coder may scan and code the coefficients inside the current CG according to a certain pre-defined scan order for 4×4 block. In JEM (The Joint Exploration Model (JEM), ieeexplore.ieee.org/document/8861068), the CG size could be either 4×4 or 2×2 depending on whether the height or width of one TB is equal to 2. FIG. 5 is a conceptual diagram illustrating the coefficient scan for an 8×8 TB containing 4 CGs in HEVC.

For each color component, the video coder may signal one flag to indicate whether current TB has at least one non-zero coefficient. For instance, the video coder may signal a coded block flag (CBF) or coded block pattern (CPB) having a value that indicates whether the current TB has at least one non-zero coefficient. If there is at least one non-zero coefficient, the video coder may explicitly signal the position of the last significant coefficient in the coefficient scan order in a TB with a coordination relative to the top-left corner of the TB. The vertical or horizontal component of the coordination may be represented by its prefix and suffix, wherein prefix may be binarized with truncated Rice (TR) and suffix is binarized with fixed length.

With such a position coded and also the coefficient scanning order of the CGs, the video coder may signal a flag for CGs except the last CG (in scanning order) which indicates whether the CG contains non-zero coefficients. For those CGs that may contain non-zero coefficients, the video coder may signal significant flags, absolute values of coefficients and sign information of non-zero coefficients for each coefficient according to the pre-defined 4×4 coefficient scan order. In HEVC transform coefficient entropy coding scheme, the sign bit, if coded, may always be by-pass coded, i.e., no context is applied and always 1 bit coded for each sign bit using equal probability (EP) assumption.

A discussion of sign data hiding follows. For a CG, and depending on a criterion, a video coder may omit coding the sign of the last nonzero coefficient (in reverse scan order) which is the first nonzero coefficient in the forward scan order when using sign data hidding (SDH). Instead, the sign value may be embedded in, and determined from, the parity of the sum of the levels of the CG using a predefined convention: even corresponds to "+" and odd to "−." The criterion to use SDH may be the distance in scan order between the first and the last nonzero coefficients of the CG. If this distance is equal or larger than a threshold (e.g., 4 samples), SDH may be used.

A discussion of coefficient sign prediction follows. To improve the coding efficiency for sign bit information, coefficient sign prediction methods have been proposed in the literature. A sign prediction method has been proposed on top of JEM.

To predict the sign for one coefficient, a video coder may reconstruct the transform block (TB) using both positive value and negative value for this sign, and each block reconstruction using a candidate sign value may be called a hypothesis reconstruction. The video coder may evaluate the two hypothesis reconstructions by a given spatial-domain cost function, and the hypothesis which minimizes the cost function gives the predicted sign value.

Furthermore, to predict multiples signs for a TB, e.g., N signs, the video coder may reconstruct the TB using different combinations of candidate sign prediction values, which includes totally $2^N$ different hypothesis reconstructions. Similarly, the video coder may evaluate each hypothesis by a given spatial-domain cost function, and the hypothesis which minimizes the cost function gives the predicted sign value combination.

The cost function typically measures spatial discontinuity between previously reconstructed neighbor pixels and the currently tested reconstructed block using one of the hypotheses. The hypothesis which shows the smoothest pixel value transition at the block boundary of the current block may be considered to be best prediction.

Figure 6:
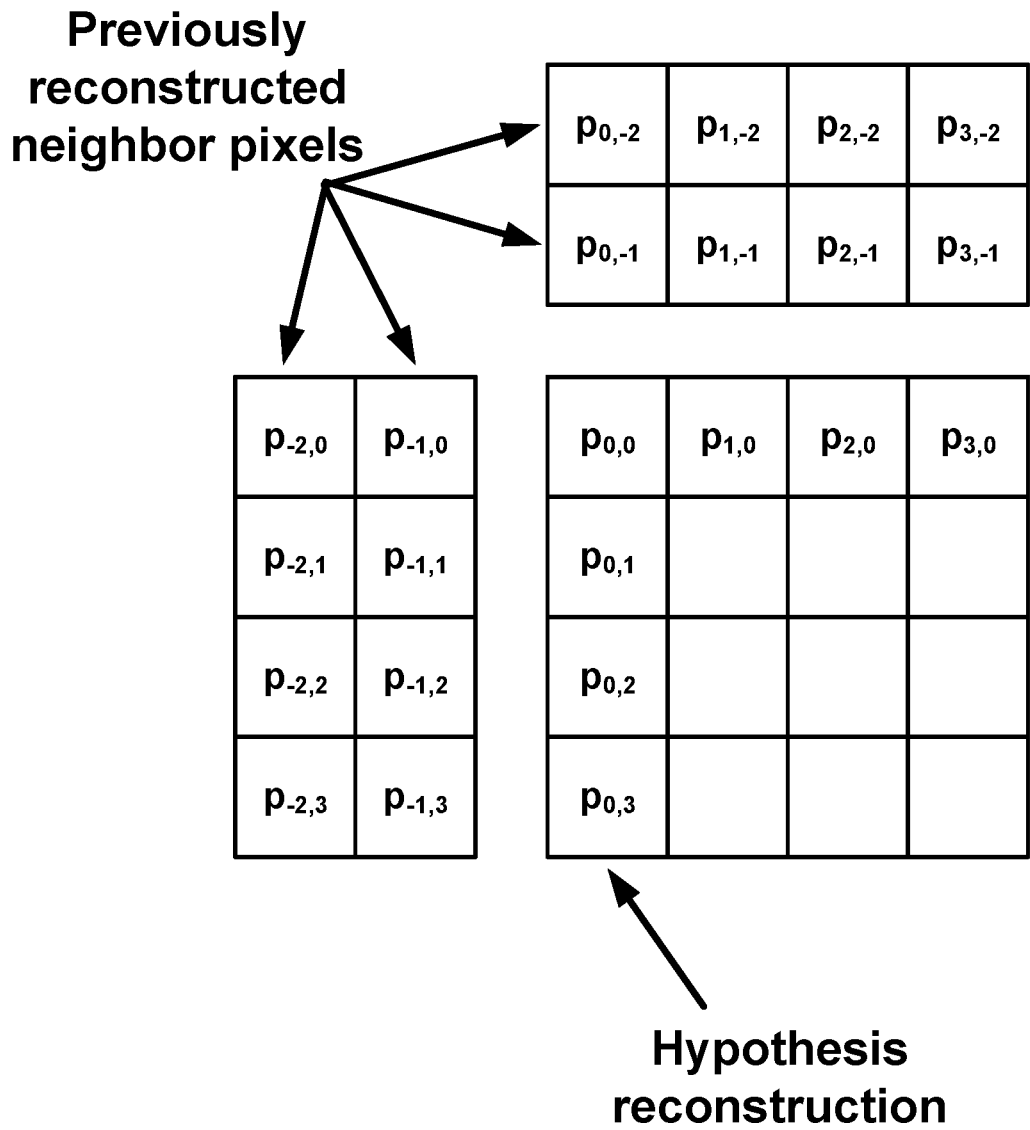
FIG. 6 is a conceptual diagram illustrating an example of coefficient sign prediction.

FIG. 6 is a conceptual diagram illustrating coefficient sign prediction. In the example of FIG. 6, the cost is measured using the the leftmost and topmost pixels of a hypothesis reconstruction.

The video coder may determine the cost in accordance with the following equation:

$$\text{cost} = \sum_{x=0}^{w-1} |(2p_{x,\_1} - p_{x,\_2}) - p_{x,0}| + \sum_{x=0}^{h-1} |(2p_{\_1,y} - p_{\_2,y}) - p_{0,y}|$$

In the above equation, the $(2p_{x,\_1}-p_{x,\_2})$ and $(2p_{\_1,y}-p_{\_2,y})$ terms are prediction components, and the $p_{x,0}$ and $p_{0,y}$ are hypothesis reconstruction components.

In a specific sign prediction scheme described in FIG. 6, the encoder may initially dequantize the TU and then choose n coefficients for which signs will be predicted. The coefficients may be scanned in raster-scan order, and dequantized values over a defined threshold are preferred over values lower than that threshold when collecting the n coefficients to treat.

With these n values, $2^n$ simplified border reconstructions may be performed as described below: one reconstruction per unique combination of signs for the n coefficients.

To reduce the complexity of performing sign prediction, the video coder may perform a template-based hypothesis reconstruction. For a particular hypothesis reconstruction, the video coder may recreate only the leftmost and topmost pixels of the block from the inverse transformation added to the block prediction. Although the first (vertical) inverse transform is complete, the second (horizontal) inverse transform only has to create the leftmost and topmost pixel outputs, and is thus faster. An additional flag, "topLeft", may be added to the inverse transform functions to allow this.

In addition, the number of inverse transform operations performed is reduced by using a system of 'templates'. In this way, when predicting n signs in a block, the video coder may perform n+1 inverse transform operations:

1. A single inverse transform operating on the dequantized coefficients, where the values of all signs being predicted are set positive. Once added to the prediction of the current block, this corresponds to the border reconstruction for the first hypothesis.
2. For each of the n coefficients having their signs predicted, an inverse transform operation is performed on an otherwise empty block containing the corresponding dequantized (and positive) coefficient as its only non-null element. The leftmost and topmost border values are saved in what is termed a 'template' for use during later reconstructions.

Border reconstruction for a later hypothesis may start by taking an appropriate saved reconstruction of a previous hypothesis which only needs a single predicted sign to be changed from positive to negative in order to construct the desired current hypothesis. This change of sign may then be approximated by the doubling and subtraction from the hypothesis border of the template corresponding to the sign being predicted. The border reconstruction, after determining cost values, is then saved if it is known to be reused for constructing later hypotheses.

| Template Name | How to Create |
| --- | --- |
| T001 | inv xform single + ve $1^{st}$ sign-hidden coeff |
| T010 | inv xform single + ve $2^{nd}$ sign-hidden coeff |
| T100 | inv xform single + ve $3^{rd}$ sign-hidden coeff |

| Hypothesis | How to Create | Store for later reuse as |
| --- | --- | --- |
| H000 | inv xform all coeffs add to pred | H000 |
| H001 | H000 - 2*T001 | |
| H010 | H000 - 2*T010 | H010 |
| H011 | H010 - 2*T001 | |
| H100 | H000 - 2*T100 | H100 |
| H101 | H100 - 2*T001 | |
| H110 | H100 - 2*T010 | H110 |
| H111 | H110 - 2*T001 | |

The above tables show save/restore and template application for 3 sign 8 entry case. Note that these approximations may be used only during the process of sign prediction, not during final reconstruction.

For a transform coefficient with larger magnitude, the sign prediction is generally giving a better chance to achieve a correct prediction. This is because an incorrect sign prediction for a transform coefficient with larger magnitude typically shows more discrepancy on the boundary sample smoothness.

With sign prediction, instead of coding the explicit sign value, the video coder may code the correctness of sign prediction. For example, for predicting a coefficient sign which actually has a positive value, if the predicted sign is also positive, i.e., the sign prediction is correct, the video coder may code a '0' bin. Otherwise, if the predicted sign is negative, i.e., the sign prediction is not correct, the video coder may code a '1' bin. In this way, the video coder may utilize the level value (magnitude) of the transform coefficient as the context for coding the correctness of sign prediction, since a larger magnitude of transform coefficient leans to a higher chance of '0' bin.

A discussion of joint coding of chroma residuals follows. Joint coding of chroma residuals (JCCR) is a video coding tool which codes the chroma residuals jointly. When JCCR is used, a single transform coefficient block is signaled for multiple color components. JCCR is part of VVC, one of the most recent video coding standards. In VVC, a TU-level JCCR flag is supported when at least one of the chroma CBFs are non-zero. If the JCCR flag is TRUE, then the decoder parses a single coefficient block from the bit-stream and derives pixel residual blocks of chroma components from the single residual block.

A discussion of cross-component linear model prediction (CCLM) follows. CCLM is a prediction method that reduces the cross-component redundancy. CCLM has been adopted into the VVC video coding standard. When CCLM is used, chroma prediction samples are generated by applying a linear model to the co-located luma samples as shown in the following equation:

$$pred_C(i,j) = \alpha \cdot rec_L'(i,j) + 62$$

where $pred_C(i,j)$ represents the predicted chroma samples in a CU and $rec_L(i,j)$ represents the downsampled reconstructed luma samples of the same CU.

The aforementioned techniques may present one or more disadvantages. For instance, when the reconstructed samples of multiple color components can be affected by the current transform block (e.g., in the case of CCLM or JCCR mode is used), considering only one color component (e.g., for sign prediction) may be sub-optimal. In particular, one hypothesis reconstruction may work well for one color component, but work poorly for other color components.

In accordance with the techniques of this disclosure, a video coder (e.g., video encoder 200 and/or video decoder 300) may take multiple color components into consideration when preforming sign prediction of residual coding. For instance, when performing sign prediction on a JCCR transform block that is used to generate a plurality of transform blocks that each correspond to a different color component (e.g., a Cb transform block and a Cr transform block), the video coder may perform the sign prediction based on the plurality of color components.

Section A. Sign prediction of multiple transform blocks jointly. As an example of considering multiple color components in sign prediction, the video coder may perform the sign prediction of multiple color components jointly. Multiple color components that have interdependencies can be selected to perform the joint sign prediction. The selection of the color components can be based on pre-defined rules and/or information signaled in the bit-stream. Hypothesis reconstructions of all the involved color components are generated and a joint cost ($Cost_{joint}$) is derived from them. The predicted values of the involved signs are determined by minimizing the joint cost value.

As described above, in case of sign prediction for a single block with N predicted signs. There are $2^N$ different combinations of signs and one of them is selected as the prediction set. In this example, the video coder may perform the sign prediction of different color components jointly, the predicted signs of the involved color components may be combined to create the joint set of predicted signs as shown in the following equation (1). The video coder may perform a union operation (U) on the sets of predicted signs of all involved color component ($Set_{color}$):

$$Set_{joint} = \bigcup_{color \in Colors} Set_{color} \quad (1.)$$

Let $N_{joint}$=size($Set_{joint}$), there are $2^{N_{joint}}$ different combinations of signs. For each combination, hypothesis reconstructions of all the involved color components are generated and a joint cost ($Cost_{joint}$) is derived based on these hypothesis reconstructions. The $Cost_{joint}$ is used as the criteria to determine with combination of signs is selected as the set of predictors of the predictively coded signs.

A special case of the joint set generation is when multiple involved color components share a single transform block. For example, when joint coding of chroma residuals (JCCR) is applied and the sign prediction is performed jointly for Cb and Cr, $Set_{C_b}=Set_{C_r}$, so $Set_{joint}= \bigcup_{color \in \{C_b,C_r\}} Set_{color}=Set_{C_b}=Set_{C_r}$. A few examples of this special case will be described below.

Section B. Sign prediction of a current transform block. As another example of considering multiple color components in sign prediction, the video coder may consider multiple components when performing sign prediction for a single transform block. This example could be applied when there is(are) other color component(s) that depend on the current color component. In this case, each of the hypothesis reconstruction can be evaluated not only based on the current color component but also based on other color component(s) that can be impacted by the current color component. Different methods of deriving the joint cost ($Cost_{joint}$) can be applied:

Same as that described above in section A, hypothesis reconstructions of all involved color components are generated and the joint cost is derived based on all these hypothesis reconstructions.

For some of the involved color component(s), hypothesis reconstructions are generated for cost calculation. While for other component(s), simplified criteria can be applied. For example, in the case of Cross-Component Linear Model (CCLM) in VVC, based on the hypothesis reconstruction of the luma (Y) component, the predicted block(s) of the corresponding chroma component(s) can be generated, instead of further generating hypothesis reconstruction(s) of the chroma component(s), the chroma prediction block(s) can be used to derive the joint cost($Cost_{joint}$).

Section C. The video coder may apply one or more conditions of using sign prediction based on multiple color components. An example of the techniques of this disclosure can define rule(s) to determine whether to do sign prediction of multiple transform blocks jointly (as described above in section A) or consider multiple color components while performing sign prediction of the current transform block (as described above in section B) for transform blocks. The rule(s) can be pre-defined for both encoder and decoder side, signaled in bit-streams or performed in a combined manner.

As an example, for a luma block which is used for Cross-Component Linear Model (CCLM) in VVC, if a corresponding chroma block has a coded block flag equal to zero (e.g., meaning no non-zero coefficients), then that chroma block is considered in the sign prediction of the luma block. In this case, the hypothesis reconstruction of the corresponding chroma block equals to the prediction block generated from the hypothesis reconstruction of luma block. There may be no need to derive the sample residuals of the chroma block when performing sign prediction of the luma block.

Section D. Derivation of joint cost of multiple color components. To consider multiple color components, a cost value that derived from all the involved color component may be needed (referred to as 'joint cost', $Cost_{joint}$). As an example, the cost of each involved color component is computed independently and the joint cost is derived as a combination of cost values of all involved color components as shown in equation (2), where S denote the set of color components that are involved in the sign prediction coding of coefficients. The weights of different color components can be fixed, derived based on rule(s) pre-defined on both encoder and decoder side or controlled by signaled syntax element(s) in bit-streams.

$$Cost_{joint} = \sum_{color \in S} w_{color} \cdot Cost_{color} \quad (2)$$

In a special case, one of the weights may be 1 and all other weight(s) are 0. Then the joint cost may be equivalent to select one color component and the video coder may use the joint cost to perform the sign prediction of the current block.

Examples of incorporating the techniques of this disclosure into joint coding of chroma residuals. In a video codec, a transform block may correspond to pixel residual blocks of multiple color components, e.g., joint coding of chroma residuals coding in VVC (JCCR). In such case, the Cb and Cr components share a single transform block. When performing the sign prediction for a pair of JCCR coded Cb&Cr blocks jointly (as described in section A), $Set_{joint} = \cup_{color \in \{Cb,Cr\}} Set_{color} = Set_{Cb} = Set_{Cr}$ hypothesis reconstructions of all involved color components can be evaluated when generating the predicted signs of the transform block. Different methods of deriving $Cost_{joint}$ may be used. For example, using the joint cost $Cost_{joint}$ derivation described in section D:

$$Cost_{joint} = \sum_{color \in S} w_{color} \cdot Cost_{color} \quad (3)$$

where S denotes the chroma color components and $w_{color}$ denotes the weight of color component color.

A few examples of how a video coder may derive $w_{color}$ are described below.

As an example, a fixed value of 1 is used as cost weights of different chroma color formats. In this case, the joint cost $Cost_{joint}$ is derived as:

$$Cost_{joint} = \sum_{color \in S} Cost_{color} \quad (4)$$

As another example, the chroma components are scanned in a specific order (The order can be derived from pre-defined rules and/or information signaled in the bit-stream) the weight of the $1^{st}$ chroma component in the bit-stream that has non-zero CBF is set to 1 and other component(s) use 0. In the case of VVC, chroma components S={Cb, Cr}, take the order "1:Cb, 2:Cr" as an example the weights of Cb and Cr are derived as follows:

```
if (CBF_Cb != 0)
{
    w_Cb = 1;
    w_Cr = 0;
}
else // CBF_Cb == 0 && CBF_Cr != 0
    w_Cb = 0;
    w_Cr = 1;
}
```

As yet another example, the weight of each color component can also be derived based on the corresponding CBF value. For example, if the CBF value for a color component is 0, then the weight is set to 0 for that color component, otherwise the weight is set to 1. In the case of VVC, chroma components S={Cb, Cr} and the weights $w_{Cb}$, $w_{Cr}$ are derived as follows:

```
w_Cb = 0;
w_Cr = 0;
if (CBF_Cb != 0)
{
    w_Cb = 1;
}
if (CBF_Cr != 0)
{
    w_Cr = 1;
}
```

Examples of incorporating the techniques of this disclosure into may be incorporated into coding tools such as CCLM, CCP. In a video codec, prediction between color components may be applied to exploit the correlations between different color components of video signal. For example, cross-component prediction (CCP) in HEVC Range Extension and Cross-Component Linear Model (CCLM) in VVC. For a transform block of a specific color component A, if there is other color component(s) that depend on A, sign prediction of the transform block can be performed jointly on both A and its dependent color components. Examples such as described in section A (e.g., perform sign prediction for multiple color components jointly) or section B (e.g., perform sign prediction for a single-color component but the impact on multiple color components are considered) may be applied in this case.

In the case of CCLM mode, for luma block is used for CCLM mode of one or more chroma components, the techniques of this disclosure can be applied on the related color components.

1. As an example, for a luma transform block, if there are one or more chroma block use the luma block to perform CCLM mode, then for each hypothesis reconstruction of the luma component, the CCLM predictor (hypothesis CCLM predictor) for the corresponding chroma component(s) are generated and evaluated. A joint cost is derived based on the hypothesis reconstruction of luma component and the hypothesis CCLM predictor of chroma component(s). Optionally, the conditions described in section C can be applied to control when this embodiment can be used. One example of such a condition is to use this example only when the corresponding chroma component(s) have CBF=0. (In this case the hypothesis CCLM predictor of the color component is equal to the hypothesis reconstruction.)

2. As another example, for a luma transform block, if there are one or more chroma block use the luma block to perform CCLM mode, then the hypothesis reconstruction is generated for all the involved color components to perform the sign prediction. In this case the residuals of chroma component(s) are generated and added to the hypothesis CCLM predictor to find the chroma hypothesis reconstruction. If the chroma component(s) uses sign prediction, too. Then the sign prediction is performed jointly.

3. Similar to example 2, this example generates hypothesis reconstructions for both luma and the related chroma components when CCLM is used, but only when the chroma does not use sign prediction.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
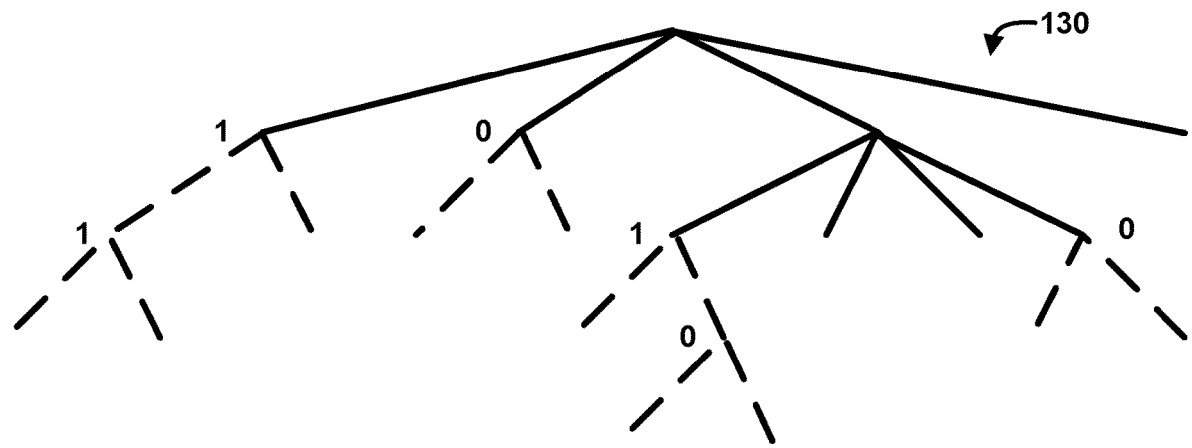
FIGS. 2A and 2B are conceptual diagrams illustrating an example quadtree binary tree (QTBT) structure, and a corresponding coding tree unit (CTU).
Figure 2B:
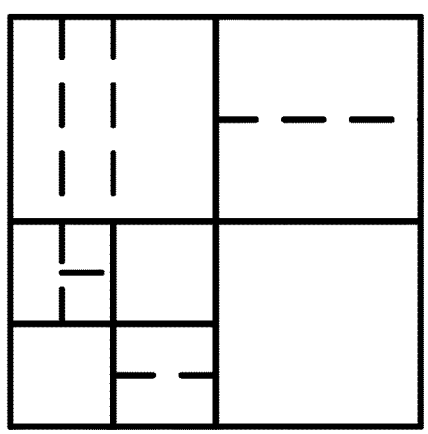

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having a width equal to MinBTSize (4, in this example) implies that no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

Figure 3:
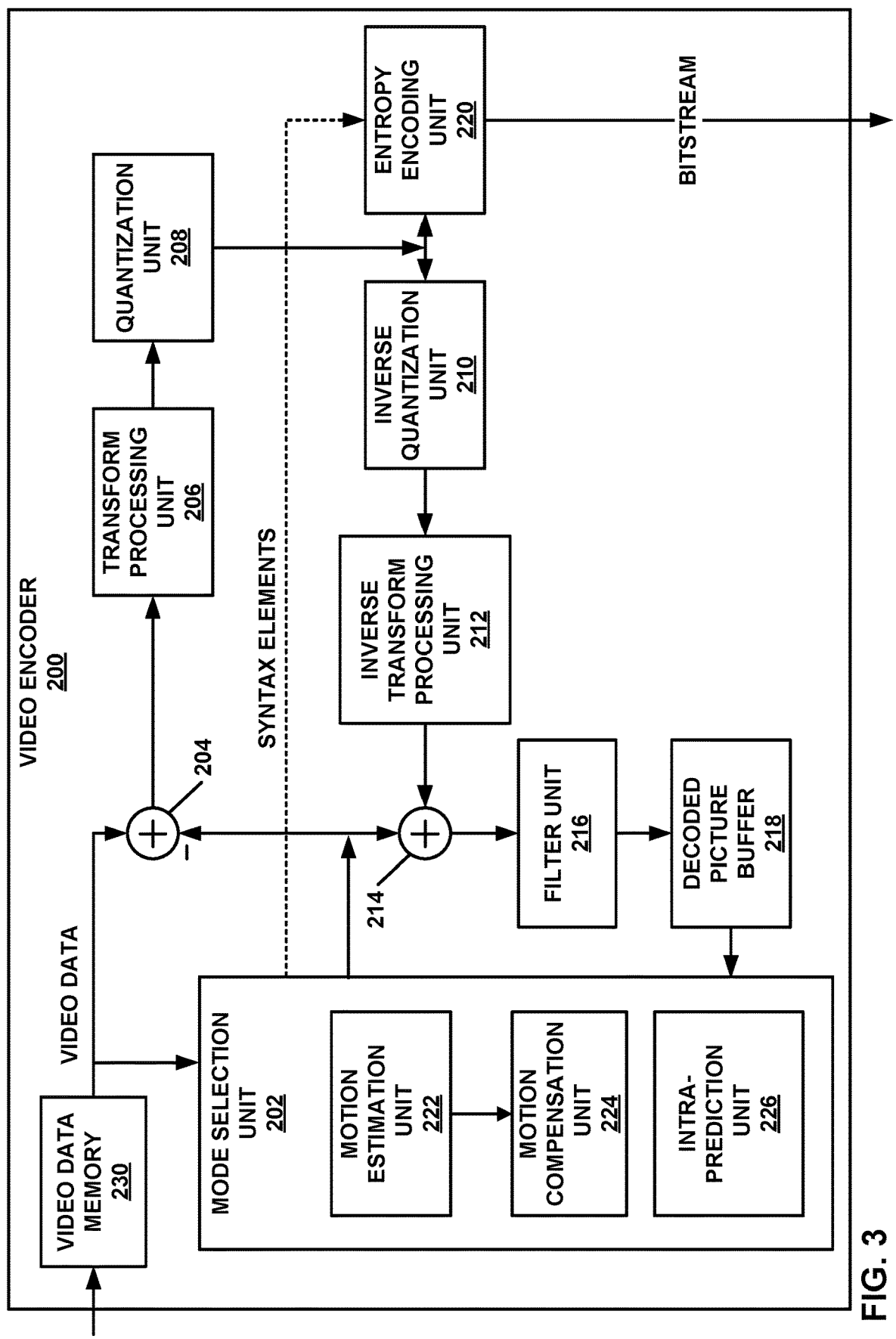
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1).

DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to predict, based on multiple color components of a block of video data, a sign of residual data of a color component of the block of video data; and reconstruct, based on the predicted sign, the block of video data.

Figure 4:
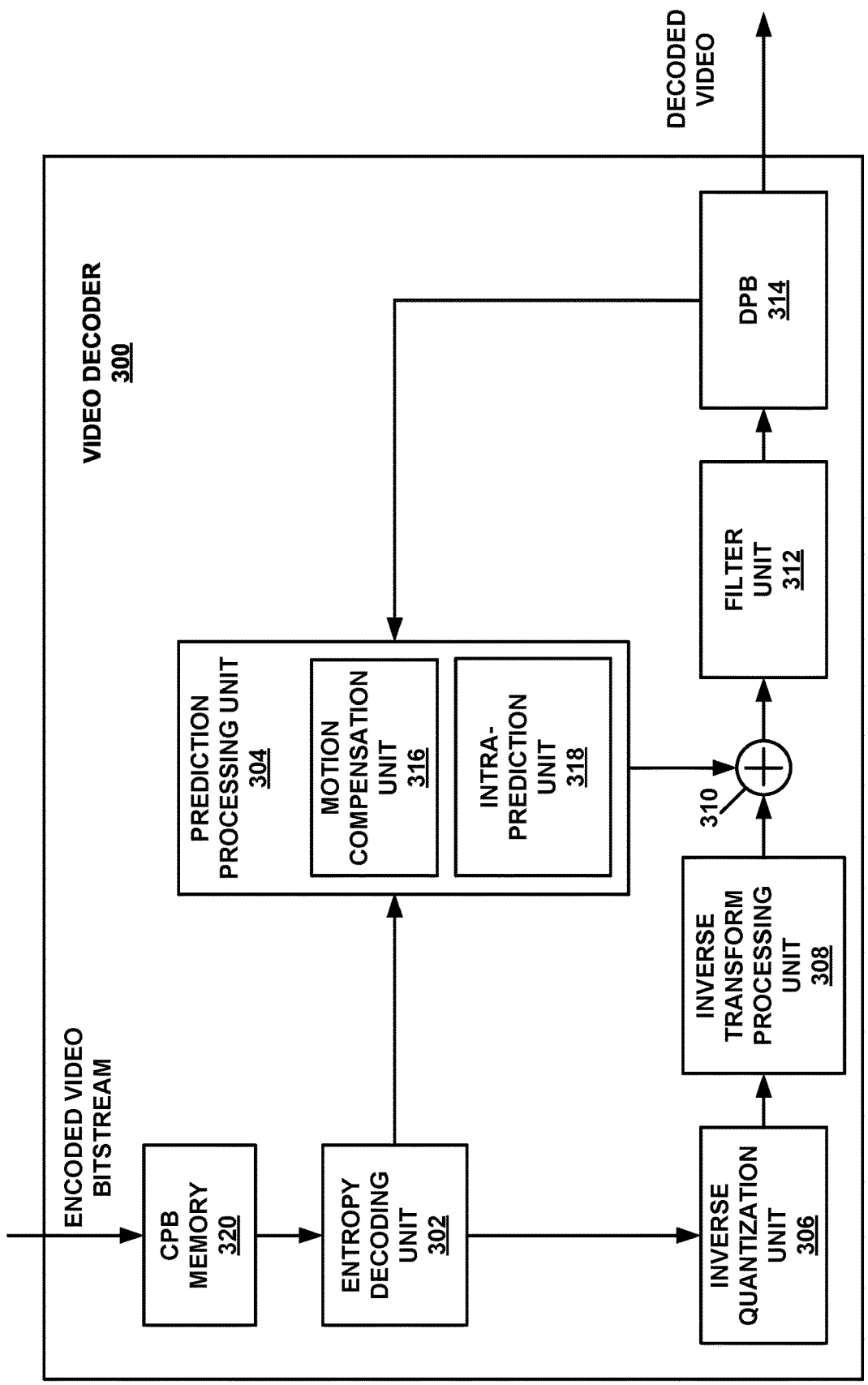
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320 Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to predict, based on multiple color components of a block of video data, a sign of residual data of a color component of the block of video data; and reconstruct, based on the predicted sign, the block of video data.

Figure 7:
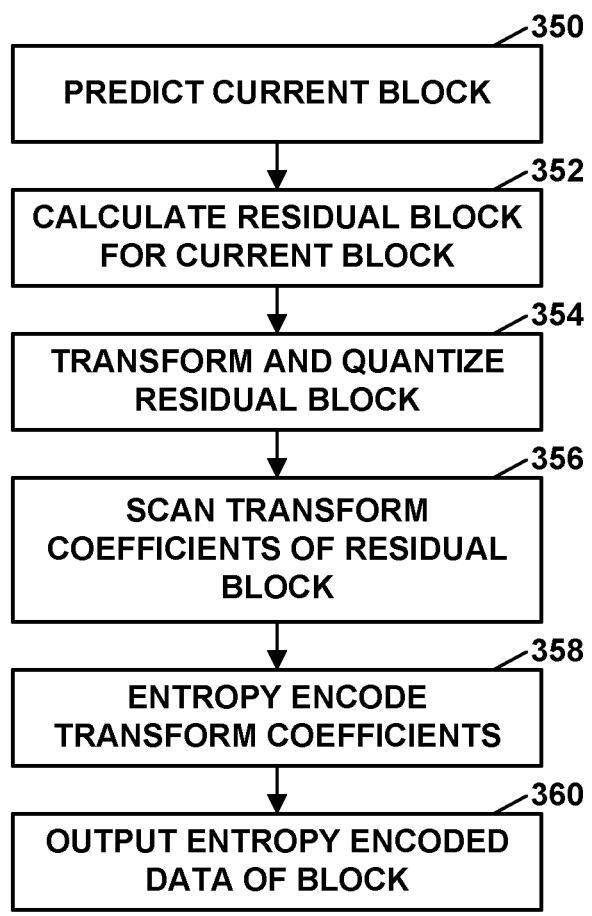
FIG. 7 is a flowchart illustrating an example method for encoding a current block in accordance with the techniques of this disclosure.

FIG. 7 is a flowchart illustrating an example method for encoding a current block in accordance with the techniques of this disclosure. The current block may comprise a current CU. Although described with respect to video encoder 200 (FIGS. 1 and 3), it should be understood that other devices may be configured to perform a method similar to that of FIG. 7.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 8:
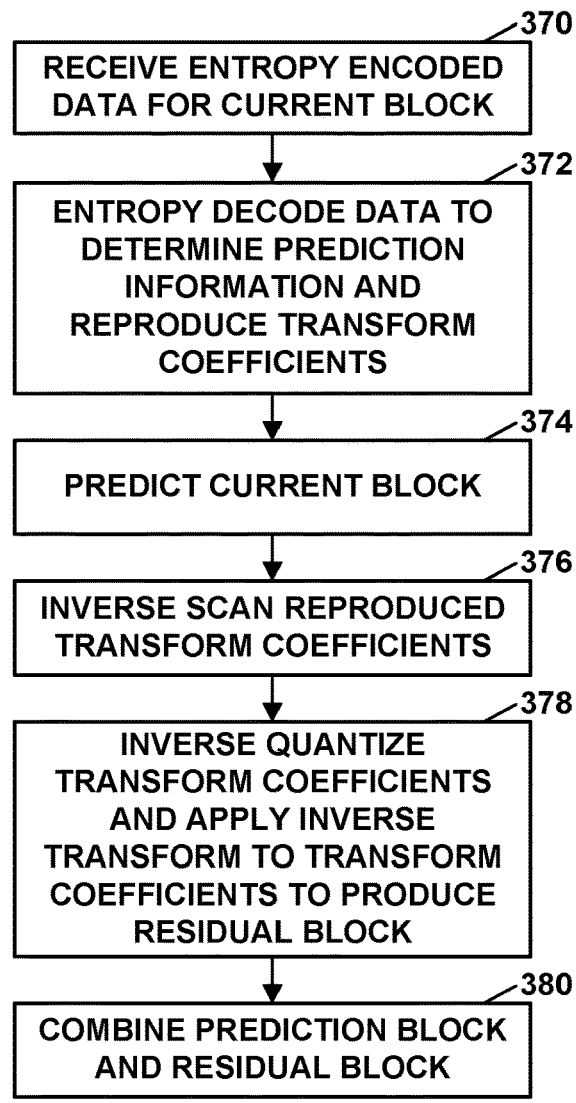
FIG. 8 is a flowchart illustrating an example method for decoding a current block in accordance with the techniques of this disclosure.

FIG. 8 is a flowchart illustrating an example method for decoding a current block of video data in accordance with the techniques of this disclosure. The current block may comprise a current CU. Although described with respect to video decoder 300 (FIGS. 1 and 4), it should be understood that other devices may be configured to perform a method similar to that of FIG. 8.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 9:
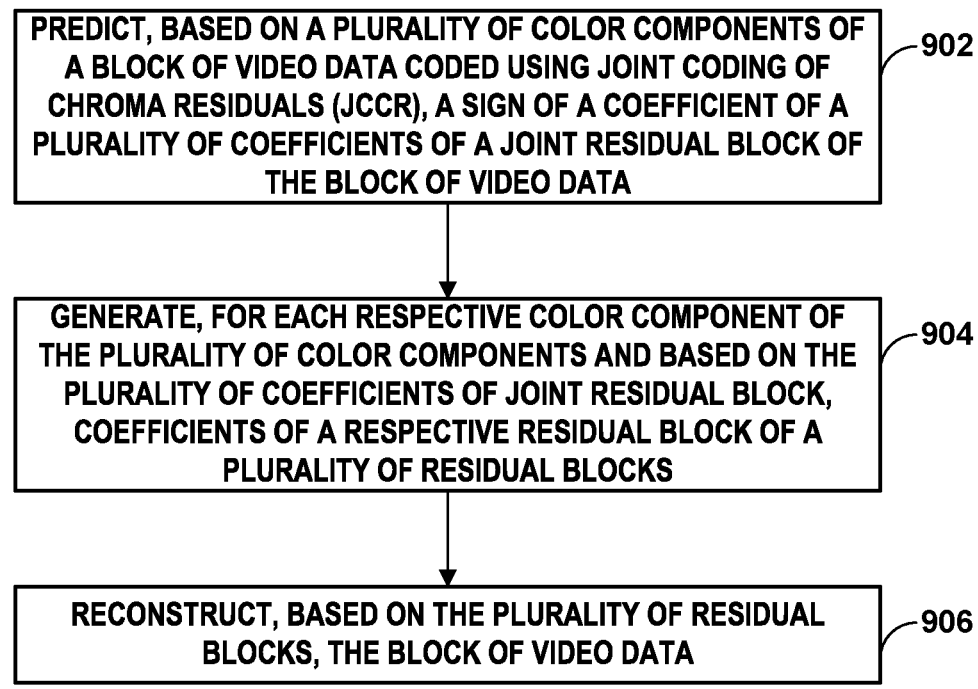
FIG. 9 is a flowchart illustrating an example method for decoding a current block using sign prediction based on multiple color components, in accordance with the techniques of this disclosure.

FIG. 9 is a flowchart illustrating an example method for decoding a current block using sign prediction based on multiple color components, in accordance with the techniques of this disclosure. The current block may comprise a current transform block (TU). Although described with respect to video decoder 300 (FIGS. 1 and 4), it should be understood that other devices may be configured to perform a method similar to that of FIG. 9. For instance, video encoder 200 (FIGS. 1 and 3) may be configured to perform a method similar to that of FIG. 9 (e.g., by inverse transform processing unit 212).

Video decoder 300 may predict, based on a plurality of color components of a block of video data coded using joint coding of chroma residuals (JCCR), a sign of a coefficient of a plurality of coefficients of a joint residual block of the block of video data (902). For instance, inverse transform processing unit 308 of video decoder 300 may generate a plurality of hypothesis reconstructions including a first hypothesis reconstruction for the sign being positive and a second hypothesis reconstruction for the sign being negative. Inverse transform processing unit 308 may evaluate the plurality of hypothesis reconstructions using a cost function and select the sign corresponding to the hypothesis reconstruction with a lowest cost value as the predicted sign for the coefficient.

To predict the sign using the cost function, inverse transform processing unit 308 may determine a joint cost value for the plurality of color components. For instance, as the predicted sign of the coefficient of the joint residual block impacts residual blocks for the plurality of color components generated based on the joint residual block (e.g., a Cb residual block and a Cr residual block), inverse transform processing unit 308 may evaluate cost for the plurality of color components. In some examples, inverse transform processing unit 308 may determine the joint cost value by at least determining the joint cost value as a weighted sum of cost values of the plurality of color components. For instance, inverse transform processing unit 308 may determine the joint cost value by at least determining a first weight for a first color component of the plurality of color components; determining a second weight for a second color component of the plurality of color components; and determining the weighted sum of the cost values of the plurality of color components based on first weight and the second weight. As one specific example, inverse transform processing unit 308 may determine the joint cost value in accordance with the following equation:

$$\text{Cost}_{joint} = \sum_{color \in S} w_{color} \cdot \text{Cost}_{color}$$

where $\text{Cost}_{joint}$ is the joint cost value, $w_{color}$ is a weight of a particular color component of the plurality of color components, S denotes a set that includes the plurality of color components, and $\text{Cost}_{color}$ is a cost value of the particular color component.

As discussed above, inverse transform processing unit 308 may determine weights for the plurality of color components (e.g., $w_{color}$). For instance, inverse transform processing unit 308 may determine a first weight for a first color component (e.g., Cb) and determine a second weight for a second color component (e.g., Cr). In some examples, inverse transform processing unit 308 may determine the weights based on which color component of the plurality of color components, including a Cb color component and a Cr color component, has a non-zero coded block flag (CBF) earlier in a scan order. As one example, where the Cb color component is scanned in the scan order before the Cr color component, inverse transform processing unit 308 may, responsive to determining that the Cb color component has a non-zero CBF, determine that the first weight is 1 and the second weight is 0. As another example, where the Cb color component is scanned in the scan order before the Cr color component, inverse transform processing unit 308 may, responsive to determining that the Cb color component has a zero CBF and that the Cr color component has a non-zero CBF, determining that the first weight is 0 and the second weight is 1. As yet another example, responsive to determining that the Cb color component has a non-zero CBF, inverse transform processing unit 308 may determine that the first weight is 1, and responsive to determining that the Cr color component has a non-zero CBF, inverse transform processing unit 308 may determine that the second weight is 1.

As discussed above, inverse transform processing unit 308 may determine multiple joint cost values (e.g., multiple hypotheses) to predict the sign for the coefficient of the joint residual block. For instance, inverse transform processing unit 308 may determine a first joint cost value of the plurality of color components for a negative sign (e.g., perform a reconstruction with the sign as negative); and determine a second joint cost value of the plurality of color components for a positive sign (e.g., perform a reconstruction with the sign as positive). As noted above, to determine the cost values, inverse transform processing unit 308 may select the sign corresponding to the most favorable (e.g., lowest) joint cost value. As one example, responsive to determining that the first joint cost (e.g., the joint cost value for the negative sign) value is less than the second joint cost value (e.g., the joint cost value for the positive sign), inverse transform processing unit 308 may predict the sign to be negative. As another example, responsive to determining that the second joint cost value is less than the first joint cost value, inverse transform processing unit 308 may predict the sign to be positive.

While described above as being performed for a single coefficient of the plurality of coefficients of the joint residual block, in some examples, inverse transform processing unit 308 may perform a similar procedure to predict signs for other coefficients of the plurality of coefficients of the joint residual block. By predicting one or more signs based on multiple color components, the techniques of this disclosure may enable more efficient signaling of video data. In particular, the more accurate sign prediction that may result from the techniques of this disclosure may reduce a number of signs that need to be signaled in a bitstream.

Inverse transform processing unit 308 may generate, for each respective color component of the plurality of color components and based on the plurality of coefficients of the joint residual block, coefficients of a respective residual block of a plurality of residual blocks (904). For instance, inverse transform processing unit 308 may generate a Cb residual block and a Cr residual block in accordance with one of the three sub-modes supported by VVC. Inverse transform processing unit 308 may derive the sub-mode index from the combination of CBF values of chroma components. If Cbf_Cb==1 and Cbf_Cr==0, the sub-mode index is 1. If Cbf_Cb==1 and Cbf_Cr==1, the sub-mode index is 2. Otherwise (Cbf_Cb==0 and Cbf_Cr==1), the sub-mode index is 3. The following table shows how the inverse-transformed joint coefficient block (resJointC) is converted to the pixel residuals of Cb and Cr (resCb and resCr).

| mode | Cb and Cr residuals |
| --- | --- |
| 1 | resCb[ x ][ y ] = resJointC[ x ][ y ] <br> resCr[ x ][ y ] = ( CSign * resJointC[ x ][ y ] ) >> 1 |
| 2 | resCb[ x ][ y ] = resJointC[ x ][ y ] <br> resCr[ x ][ y ] = CSign * resJointC[ x ][ y ] |
| 3 | resCb[x ][ y ] = ( CSign * resJointC[ x ][ y ] ) >>1 <br> resCr[ x ][ y ] = resJointC[ x ][ y ] |

Inverse transform processing unit 308 may derive the value of CSign from the ph_joint_cbcr_sign_flag in picture header:

$$CSign = 1 - 2*ph\_joint\_cbcr\_sign\_flag$$

Inverse transform processing unit 308 may reconstruct, based on the plurality of residual blocks, the block of video data (906). For instance, similar to operation 380 of FIG. 8, reconstruction unit 310 may combine respective reconstructed prediction blocks for the color components with their respective residual block. For example, reconstruction unit 310 may add values of the Cb residual block with values of a Cb prediction block (e.g., generated by prediction processing unit 304) to generate a reconstructed Cb block and add values of the Cr residual block with values of a Cr prediction block (e.g., generated by prediction processing unit 304) to generate a reconstructed Cr block.

The following numbered clauses may illustrate one or more aspects of the disclosure:

Clause 1A. A method of coding video data, the method comprising: predicting, based on multiple color components of a block of video data, a sign of residual data of a color component of the block of video data; and reconstructing, based on the predicted sign, the block of video data.

Clause 2A. The method of clause 1A, wherein predicting the sign comprises: jointly predicting signs of multiple color components of the block of video data.

Clause 3A. The method of clause 2A, wherein jointly predicting the signs comprises: determining a joint cost value of the multiple color components; and predicant the signs of the multiple color components based on the determined joint cost value.

Clause 4A. The method of clause 3A, wherein determining the joint cost value comprises determining the joint cost value in accordance with the following equation: $Cost_{joint} = \Sigma_{color \in S} w_{color} \cdot Cost_{color}$ where $Cost_{joint}$ is the joint cost value, $w_{color}$ is a weight of a particular color component of the multiple color components, S denotes a set that includes the multiple color components, and $Cost_{color}$ is a cost value of the particular color component.

Clause 5A. The method of any of clauses 1A-4A, wherein coding comprises decoding.

Clause 6A. The method of any of clauses 1A-5A, wherein coding comprises encoding.

Clause 7A. A device for coding video data, the device comprising one or more means for performing the method of any of clauses 1A-6A.

Clause 8A. The device of clause 7A, wherein the one or more means comprise one or more processors implemented in circuitry.

Clause 9A. The device of any of clauses 6A and 8A, further comprising a memory to store the video data.

Clause 10A. The device of any of clauses 6A-9A, further comprising a display configured to display decoded video data.

Clause 11A. The device of any of clauses 6A-10A, wherein the device comprises one or more of a camera, a computer, a mobile device, a broadcast receiver device, or a set-top box.

Clause 12A. The device of any of clauses 6A-11A, wherein the device comprises a video decoder.

Clause 13A. The device of any of clauses 6A-12A, wherein the device comprises a video encoder.

Clause 14A. A computer-readable storage medium having stored thereon instructions that, when executed, cause one or more processors to perform the method of any of clauses 1A-6A.

Clause 1B. A method of decoding video data, the method comprising: predicting, based on a plurality of color components of a block of video data coded using joint coding of chroma residuals (JCCR), a sign of a coefficient of a plurality of coefficients of a joint residual block of the block of video data; generating, for each respective color component of the plurality of color components and based on the plurality of coefficients of the joint residual block, coefficients of a respective residual block of a plurality of residual blocks; and reconstructing, based on the plurality of residual blocks, the block of video data.

Clause 2B. The method of clause 1B, wherein predicting the sign comprises: determining a joint cost value of the plurality of color components; and predicting the sign based on the joint cost value.

Clause 3B. The method of clause 2B, wherein determining the joint cost value comprises determining the joint cost value as a weighted sum of cost values of the plurality of color components.

Clause 4B. The method of clause 3B, wherein determining the joint cost value as the weighted sum of the cost values of the plurality of color components comprises determining the joint cost value in accordance with the following equation:

$$Cost_{joint} = \sum_{color \in S} w_{color} \cdot Cost_{color}$$

where $Cost_{joint}$ is the joint cost value, $w_{color}$ is a weight of a particular color component of the plurality of color components, S denotes a set that includes the plurality of color components, and $Cost_{color}$ is a cost value of the particular color component.

Clause 5B. The method of clause 3B, further comprising: determining a first weight for a first color component of the plurality of color components; determining a second weight for a second color component of the plurality of color components; and determining the weighted sum of the cost values of the plurality of color components based on first weight and the second weight.

Clause 6B. The method of clause 5B, wherein determining the first weight and the second weight comprises: determining, based on which color component of the plurality of color components has a non-zero coded block flag (CBF) earlier in a scan order, the first weight and the second weight.

Clause 7B. The method of clause 6B, wherein the first color component is a Cb color component and the second color component is a Cr color component.

Clause 8B. The method of clause 7B, wherein the Cb color component is scanned in the scan order before the Cr color component, the method further comprising: responsive to determining that the Cb color component has a non-zero CBF, determining that the first weight is 1 and the second weight is 0.

Clause 9B. The method of clause 7B, wherein the Cb color component is scanned in the scan order before the Cr color component, the method further comprising: responsive to determining that the Cb color component has a zero CBF and that the Cr color component has a non-zero CBF, determining that the first weight is 0 and the second weight is 1.

Clause 10B. The method of clause 7B, further comprising: responsive to determining that the Cb color component has a non-zero CBF, determining that the first weight is 1; and responsive to determining that the Cr color component has a non-zero CBF, determining that the second weight is 1.

Clause 11B. The method of clause 2B, wherein determining the joint cost value of the multiple color components comprises: determining a first joint cost value of the plurality of color components for a negative sign; and determining a second joint cost value of the plurality of color components for a positive sign, wherein predicting the sign of the residual data comprises: responsive to determining that the first joint cost value is less than the second joint cost value, predicting the sign to be negative; and responsive to determining that the second joint cost value is less than the first joint cost value, predicting the sign to be positive.

Clause 12B. A method of encoding video data, the method comprising: predicting, based on a plurality of color components of a block of video data coded using joint coding of chroma residuals (JCCR), a sign of a coefficient of a plurality of coefficients of a joint residual block of the block of video data; generating, for each respective color component of the plurality of color components and based on the plurality of coefficients of the joint residual block, coefficients of a respective residual block of a plurality of residual blocks; and reconstructing, based on the plurality of residual blocks, the block of video data.

Clause 13B. The method of clause 12B, wherein predicting the sign comprises: determining a joint cost value of the plurality of color components; and predicting the sign based on the joint cost value.

Clause 14B. The method of clause 13B, wherein determining the joint cost value comprises determining the joint cost value as a weighted sum of cost values of the plurality of color components.

Clause 15B. The method of clause 14B, wherein determining the joint cost value as the weighted sum of the cost values of the plurality of color components comprises determining the joint cost value in accordance with the following equation:

$$\text{Cost}_{joint} = \sum_{color \in S} w_{color} \cdot \text{Cost}_{color}$$

where $\text{Cost}_{joint}$ is the joint cost value, $w_{color}$ is a weight of a particular color component of the plurality of color components, S denotes a set that includes the plurality of color components, and $\text{Cost}_{color}$ is a cost value of the particular color component.

Clause 16B. The method of clause 14B, further comprising: determining a first weight for a first color component of the plurality of color components; determining a second weight for a second color component of the plurality of color components; and determining the weighted sum of the cost values of the plurality of color components based on first weight and the second weight.

Clause 17B. The method of clause 16B, wherein determining the first weight and the second weight comprises: determining, based on which color component of the plurality of color components has a non-zero coded block flag (CBF) earlier in a scan order, the first weight and the second weight.

Clause 18B. The method of clause 17B, wherein the first color component is a Cb color component and the second color component is a Cr color component.

Clause 19B. The method of clause 18B, wherein the Cb color component is scanned in the scan order before the Cr color component, the method further comprising: responsive to determining that the Cb color component has a non-zero CBF, determining that the first weight is 1 and the second weight is 0.

Clause 20B. The method of clause 18B, wherein the Cb color component is scanned in the scan order before the Cr color component, the method further comprising: responsive to determining that the Cb color component has a zero CBF and that the Cr color component has a non-zero CBF, determining that the first weight is 0 and the second weight is 1.

Clause 21B. The method of clause 18B, further comprising: responsive to determining that the Cb color component has a non-zero CBF, determining that the first weight is 1; and responsive to determining that the Cr color component has a non-zero CBF, determining that the second weight is 1.

Clause 22B. The method of clause 13B, wherein determining the joint cost value of the multiple color components comprises: determining a first joint cost value of the plurality of color components for a negative sign; and determining a second joint cost value of the plurality of color components for a positive sign, wherein predicting the sign of the residual data comprises: responsive to determining that the first joint cost value is less than the second joint cost value, predicting the sign to be negative; and responsive to determining that the second joint cost value is less than the first joint cost value, predicting the sign to be positive.

Clause 23B. A device for decoding video data, the device comprising: a memory configured to store video data; and one or more processors implemented in circuitry and configured to: predict, based on a plurality of color components of a block of video data coded using joint coding of chroma residuals (JCCR), a sign of a coefficient of a plurality of coefficients of a joint residual block of the block of video data; generate, for each respective color component of the plurality of color components and based on the plurality of coefficients of the joint residual block, coefficients of a respective residual block of a plurality of residual blocks; and reconstruct, based on the plurality of residual blocks, the block of video data.

Clause 24B. The device of clause 23B, wherein, to predict the sign, the one or more processors are configured to: determine a joint cost value of the plurality of color components; and predict the sign based on the joint cost value.

Clause 25B. The device of clause 24B, wherein, to determine the joint cost value, the one or more processors are configured to determine the joint cost value as a weighted sum of cost values of the plurality of color components.

Clause 26B. The device of clause 25B, wherein the one or more processors are further configured to: determine a first weight for a first color component of the plurality of color components; determine a second weight for a second color component of the plurality of color components; and determine the weighted sum of the cost values of the plurality of color components based on first weight and the second weight.

Clause 27B. The device of clause 26B, wherein, to determine the first weight and the second weight, the one or more processors are configured to: determine, based on which color component of the plurality of color components has a non-zero coded block flag (CBF) earlier in a scan order, the first weight and the second weight.

Clause 28B. The device of clause 27B, wherein the first color component is a Cb color component and the second color component is a Cr color component.

Clause 29B. The device of clause 28B, wherein the Cb color component is scanned in the scan order before the Cr color component, and wherein the one or more processors are further configured to: determine, responsive to determining that the Cb color component has a non-zero CBF, that the first weight is 1 and the second weight is 0.

Clause 30B. The device of clause 28B, wherein the Cb color component is scanned in the scan order before the Cr color component, and wherein the one or more processors are further configured to: determine, responsive to determining that the Cb color component has a zero CBF and that the Cr color component has a non-zero CBF, that the first weight is 0 and the second weight is 1.

Clause 31B. A device for encoding video data, the device comprising: a memory configured to store video data; and one or more processors implemented in circuitry and configured to: predict, based on a plurality of color components of a block of video data coded using joint coding of chroma residuals (JCCR), a sign of a coefficient of a plurality of coefficients of a joint residual block of the block of video data; generate, for each respective color component of the plurality of color components and based on the plurality of coefficients of the joint residual block, coefficients of a respective residual block of a plurality of residual blocks; and reconstruct, based on the plurality of residual blocks, the block of video data.

Clause 32B. The device of clause 31B, wherein, to predict the sign, the one or more processors are configured to: determine a joint cost value of the plurality of color components; and predict the sign based on the joint cost value.

Clause 33B. The device of clause 32B, wherein, to determine the joint cost value, the one or more processors are configured to determine the joint cost value as a weighted sum of cost values of the plurality of color components.

Clause 34B. The device of clause 33B, wherein the one or more processors are further configured to: determine a first weight for a first color component of the plurality of color components; determine a second weight for a second color component of the plurality of color components; and determine the weighted sum of the cost values of the plurality of color components based on first weight and the second weight.

Clause 35B. The device of clause 34B, wherein, to determine the first weight and the second weight, the one or more processors are configured to: determine, based on which color component of the plurality of color components has a non-zero coded block flag (CBF) earlier in a scan order, the first weight and the second weight.

Clause 36B. The device of clause 35B, wherein the first color component is a Cb color component and the second color component is a Cr color component.

Clause 37B. The device of clause 36B, wherein the Cb color component is scanned in the scan order before the Cr color component, and wherein the one or more processors are further configured to: determine, responsive to determining that the Cb color component has a non-zero CBF, that the first weight is 1 and the second weight is 0.

Clause 38B. The device of clause 36B, wherein the Cb color component is scanned in the scan order before the Cr color component, and wherein the one or more processors are further configured to: determine, responsive to determining that the Cb color component has a zero CBF and that the Cr color component has a non-zero CBF, that the first weight is 0 and the second weight is 1.

Clause 39B. A device for coding video data, the device comprising: means for predicting, based on a plurality of color components of a block of video data coded using joint coding of chroma residuals (JCCR), a sign of a coefficient of a plurality of coefficients of a joint residual block of the block of video data; means for generating, for each respective color component of the plurality of color components and based on the plurality of coefficients of the joint residual block, coefficients of a respective residual block of a plurality of residual blocks; and means for reconstructing, based on the plurality of residual blocks, the block of video data.

Clause 40B. A computer-readable storage medium storing instructions that, when executed, cause one or more processors of a video coder to: predict, based on a plurality of color components of a block of video data coded using joint coding of chroma residuals (JCCR), a sign of a coefficient of a plurality of coefficients of a joint residual block of the block of video data; generate, for each respective color component of the plurality of color components and based on the plurality of coefficients of the joint residual block, coefficients of a respective residual block of a plurality of residual blocks; and reconstruct, based on the plurality of residual blocks, the block of video data.

Clause 1C. A method of decoding video data, the method comprising: predicting, based on a plurality of color components of a block of video data coded using joint coding of chroma residuals (JCCR), a sign of a coefficient of a plurality of coefficients of a joint residual block of the block of video data; generating, for each respective color component of the plurality of color components and based on the plurality of coefficients of the joint residual block, coefficients of a respective residual block of a plurality of residual blocks; and reconstructing, based on the plurality of residual blocks, the block of video data.

Clause 2C. The method of clause 1C, wherein predicting the sign comprises: determining a joint cost value of the plurality of color components; and predicting the sign based on the joint cost value.

Clause 3C. The method of clause 2C, wherein determining the joint cost value comprises determining the joint cost value as a weighted sum of cost values of the plurality of color components.

Clause 4C. The method of clause 3C, wherein determining the joint cost value as the weighted sum of the cost values of the plurality of color components comprises determining the joint cost value in accordance with the following equation:

$$\text{Cost}_{joint} = \sum_{color \in S} w_{color} \cdot \text{Cost}_{color}$$

where $\text{Cost}_{joint}$ is the joint cost value, $w_{color}$ is a weight of a particular color component of the plurality of color components, S denotes a set that includes the plurality of color components, and $\text{Cost}_{color}$ is a cost value of the particular color component.

Clause 5C. The method of clause 3C or 4C, further comprising: determining a first weight for a first color component of the plurality of color components; determining a second weight for a second color component of the plurality of color components; and determining the weighted sum of the cost values of the plurality of color components based on first weight and the second weight.

Clause 6C. The method of clause 5C, wherein determining the first weight and the second weight comprises: determining, based on which color component of the plurality of color components has a non-zero coded block flag (CBF) earlier in a scan order, the first weight and the second weight.

Clause 7C. The method of clause 6C, wherein the first color component is a Cb color component and the second color component is a Cr color component.

Clause 8C. The method of clause 7C, wherein the Cb color component is scanned in the scan order before the Cr color component, the method further comprising: responsive to determining that the Cb color component has a non-zero CBF, determining that the first weight is 1 and the second weight is 0.

Clause 9C. The method of clause 7C or 8C, wherein the Cb color component is scanned in the scan order before the Cr color component, the method further comprising: responsive to determining that the Cb color component has a zero CBF and that the Cr color component has a non-zero CBF, determining that the first weight is 0 and the second weight is 1.

Clause 10C. The method of clause 7C, further comprising: responsive to determining that the Cb color component has a non-zero CBF, determining that the first weight is 1; and responsive to determining that the Cr color component has a non-zero CBF, determining that the second weight is 1.

Clause 11C. The method of any of clauses 2C-10C, wherein determining the joint cost value of the multiple color components comprises: determining a first joint cost value of the plurality of color components for a negative sign; and determining a second joint cost value of the plurality of color components for a positive sign, wherein predicting the sign of the residual data comprises: responsive to determining that the first joint cost value is less than the second joint cost value, predicting the sign to be negative; and responsive to determining that the second joint cost value is less than the first joint cost value, predicting the sign to be positive.

Clause 12C. A method of encoding video data, the method comprising: predicting, based on a plurality of color components of a block of video data coded using joint coding of chroma residuals (JCCR), a sign of a coefficient of a plurality of coefficients of a joint residual block of the block of video data; generating, for each respective color component of the plurality of color components and based on the plurality of coefficients of the joint residual block, coefficients of a respective residual block of a plurality of residual blocks; and reconstructing, based on the plurality of residual blocks, the block of video data.

Clause 13C. The method of clause 12C, wherein predicting the sign comprises: determining a joint cost value of the plurality of color components; and predicting the sign based on the joint cost value.

Clause 14C. The method of clause 13C, wherein determining the joint cost value comprises determining the joint cost value as a weighted sum of cost values of the plurality of color components.

Clause 15C. The method of clause 14C, wherein determining the joint cost value as the weighted sum of the cost values of the plurality of color components comprises determining the joint cost value in accordance with the following equation:

$$\text{Cost}_{joint} = \sum_{color \in S} w_{color} \cdot \text{Cost}_{color}$$

where $\text{Cost}_{joint}$ is the joint cost value, $w_{color}$ is a weight of a particular color component of the plurality of color components, S denotes a set that includes the plurality of color components, and $\text{Cost}_{color}$ is a cost value of the particular color component.

Clause 16C. The method of clause 14C or 15C, further comprising: determining a first weight for a first color component of the plurality of color components; determining a second weight for a second color component of the plurality of color components; and determining the weighted sum of the cost values of the plurality of color components based on first weight and the second weight.

Clause 17C. The method of clause 16C, wherein determining the first weight and the second weight comprises: determining, based on which color component of the plurality of color components has a non-zero coded block flag (CBF) earlier in a scan order, the first weight and the second weight.

Clause 18C. The method of clause 17C, wherein the first color component is a Cb color component and the second color component is a Cr color component.

Clause 19C. The method of clause 18C, wherein the Cb color component is scanned in the scan order before the Cr color component, the method further comprising: responsive to determining that the Cb color component has a non-zero CBF, determining that the first weight is 1 and the second weight is 0.

Clause 20C. The method of clause 18C or 19C, wherein the Cb color component is scanned in the scan order before the Cr color component, the method further comprising: responsive to determining that the Cb color component has a zero CBF and that the Cr color component has a non-zero CBF, determining that the first weight is 0 and the second weight is 1.

Clause 21C. The method of clause 18C, further comprising: responsive to determining that the Cb color component has a non-zero CBF, determining that the first weight is 1; and responsive to determining that the Cr color component has a non-zero CBF, determining that the second weight is 1.

Clause 22C. The method of any of clauses 13C-21C, wherein determining the joint cost value of the multiple color components comprises: determining a first joint cost value of the plurality of color components for a negative sign; and determining a second joint cost value of the plurality of color components for a positive sign, wherein predicting the sign of the residual data comprises: responsive to determining that the first joint cost value is less than the second joint cost value, predicting the sign to be negative; and responsive to determining that the second joint cost value is less than the first joint cost value, predicting the sign to be positive.

Clause 23C. A device for decoding video data, the device comprising: a memory configured to store video data; and one or more processors implemented in circuitry and configured to: predict, based on a plurality of color components of a block of video data coded using joint coding of chroma residuals (JCCR), a sign of a coefficient of a plurality of coefficients of a joint residual block of the block of video data; generate, for each respective color component of the plurality of color components and based on the plurality of coefficients of the joint residual block, coefficients of a respective residual block of a plurality of residual blocks; and reconstruct, based on the plurality of residual blocks, the block of video data.

Clause 24C. The device of clause 23C, wherein, to predict the sign, the one or more processors are configured to: determine a joint cost value of the plurality of color components; and predict the sign based on the joint cost value.

Clause 25C. The device of clause 24C, wherein, to determine the joint cost value, the one or more processors are configured to determine the joint cost value as a weighted sum of cost values of the plurality of color components.

Clause 26C. The device of clause 25C, wherein the one or more processors are further configured to: determine a first weight for a first color component of the plurality of color components; determine a second weight for a second color component of the plurality of color components; and determine the weighted sum of the cost values of the plurality of color components based on first weight and the second weight.

Clause 27C. The device of clause 26C, wherein, to determine the first weight and the second weight, the one or more processors are configured to: determine, based on which color component of the plurality of color components has a non-zero coded block flag (CBF) earlier in a scan order, the first weight and the second weight.

Clause 28C. The device of clause 27C, wherein the first color component is a Cb color component and the second color component is a Cr color component.

Clause 29C. The device of clause 28C, wherein the Cb color component is scanned in the scan order before the Cr color component, and wherein the one or more processors are further configured to: determine, responsive to determining that the Cb color component has a non-zero CBF, that the first weight is 1 and the second weight is 0.

Clause 30C. The device of clause 28, wherein the Cb color component is scanned in the scan order before the Cr color component, and wherein the one or more processors are further configured to: determine, responsive to determining that the Cb color component has a zero CBF and that the Cr color component has a non-zero CBF, that the first weight is 0 and the second weight is 1.

Clause 31C. A device for encoding video data, the device comprising: a memory configured to store video data; and one or more processors implemented in circuitry and configured to: predict, based on a plurality of color components of a block of video data coded using joint coding of chroma residuals (JCCR), a sign of a coefficient of a plurality of coefficients of a joint residual block of the block of video data; generate, for each respective color component of the plurality of color components and based on the plurality of coefficients of the joint residual block, coefficients of a respective residual block of a plurality of residual blocks; and reconstruct, based on the plurality of residual blocks, the block of video data.

Clause 32C. The device of clause 31C, wherein, to predict the sign, the one or more processors are configured to: determine a joint cost value of the plurality of color components; and predict the sign based on the joint cost value.

Clause 33C. The device of clause 32C, wherein, to determine the joint cost value, the one or more processors are configured to determine the joint cost value as a weighted sum of cost values of the plurality of color components.

Clause 34C. The device of clause 33C, wherein the one or more processors are further configured to: determine a first weight for a first color component of the plurality of color components; determine a second weight for a second color component of the plurality of color components; and determine the weighted sum of the cost values of the plurality of color components based on first weight and the second weight.

Clause 35C. The device of clause 34C, wherein, to determine the first weight and the second weight, the one or more processors are configured to: determine, based on which color component of the plurality of color components has a non-zero coded block flag (CBF) earlier in a scan order, the first weight and the second weight.

Clause 36C. The device of clause 35C, wherein the first color component is a Cb color component and the second color component is a Cr color component.

Clause 37C. The device of clause 36C, wherein the Cb color component is scanned in the scan order before the Cr color component, and wherein the one or more processors are further configured to: determine, responsive to determining that the Cb color component has a non-zero CBF, that the first weight is 1 and the second weight is 0.

Clause 38C. The device of clause 36C, wherein the Cb color component is scanned in the scan order before the Cr color component, and wherein the one or more processors are further configured to: determine, responsive to determining that the Cb color component has a zero CBF and that the Cr color component has a non-zero CBF, that the first weight is 0 and the second weight is 1.

Clause 39C. A device for coding video data, the device comprising: means for predicting, based on a plurality of color components of a block of video data coded using joint coding of chroma residuals (JCCR), a sign of a coefficient of a plurality of coefficients of a joint residual block of the block of video data; means for generating, for each respective color component of the plurality of color components and based on the plurality of coefficients of the joint residual block, coefficients of a respective residual block of a plurality of residual blocks; and means for reconstructing, based on the plurality of residual blocks, the block of video data.

Clause 40C. A computer-readable storage medium storing instructions that, when executed, cause one or more processors of a video coder to: predict, based on a plurality of color components of a block of video data coded using joint coding of chroma residuals (JCCR), a sign of a coefficient of a plurality of coefficients of a joint residual block of the block of video data; generate, for each respective color component of the plurality of color components and based on the plurality of coefficients of the joint residual block, coefficients of a respective residual block of a plurality of residual blocks; and reconstruct, based on the plurality of residual blocks, the block of video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
predicting, based on a plurality of color components of a block of video data coded using joint coding of chroma residuals (JCCR), a sign of a coefficient of a plurality of coefficients of a joint residual block of the block of video data, wherein predicting the sign comprises:
determining, based on which color component of the plurality of color components has a non-zero coded block flag (CBF) earlier in a scan order, a first weight for a first color component of the plurality of color components and a second weight for a second color component of the plurality of color components; and
predicting, based on the first weight and the second weight, the sign;
generating, for each respective color component of the plurality of color components and based on the plurality of coefficients of the joint residual block, coefficients of a respective residual block of a plurality of residual blocks; and
reconstructing, based on the plurality of residual blocks, the block of video data.

2. The method of claim 1, wherein predicting the sign comprises:
determining, based on the first weight and the second weight, a joint cost value of the plurality of color components; and
predicting the sign based on the joint cost value.

3. The method of claim 2, wherein determining the joint cost value comprises determining, based on the first weight and the second weight, the joint cost value as a weighted sum of cost values of the plurality of color components.

4. The method of claim 3, wherein determining the joint cost value as the weighted sum of the cost values of the plurality of color components comprises determining the joint cost value in accordance with the following equation:

$$\text{Cost}_{joint} = \sum_{color \in S} w_{color} \cdot \text{Cost}_{color}$$

where $\text{Cost}_{joint}$ is the joint cost value, $w_{color}$ is a weight of a particular color component of the plurality of color components, S denotes a set that includes the plurality of color components, and $\text{Cost}_{color}$ is a cost value of the particular color component.

5. The method of claim 1, wherein the first color component is a Cb color component and the second color component is a Cr color component.

6. The method of claim 5, wherein the Cb color component is scanned in the scan order before the Cr color component, the method further comprising:
  responsive to determining that the Cb color component has a non-zero CBF, determining that the first weight is 1 and the second weight is 0.

7. The method of claim 5, wherein the Cb color component is scanned in the scan order before the Cr color component, the method further comprising:
  responsive to determining that the Cb color component has a zero CBF and that the Cr color component has a non-zero CBF, determining that the first weight is 0 and the second weight is 1.

8. The method of claim 5, further comprising:
  responsive to determining that the Cb color component has a non-zero CBF, determining that the first weight is 1; and
  responsive to determining that the Cr color component has a non-zero CBF, determining that the second weight is 1.

9. The method of claim 2, wherein determining the joint cost value of the plurality of color components comprises:
  determining a first joint cost value of the plurality of color components for a negative sign; and
  determining a second joint cost value of the plurality of color components for a positive sign, wherein predicting the sign of the joint residual block comprises:
  responsive to determining that the first joint cost value is less than the second joint cost value, predicting the sign to be negative; and
  responsive to determining that the second joint cost value is less than the first joint cost value, predicting the sign to be positive.

10. A method of encoding video data, the method comprising:
  predicting, based on a plurality of color components of a block of video data coded using joint coding of chroma residuals (JCCR), a sign of a coefficient of a plurality of coefficients of a joint residual block of the block of video data, wherein predicting the sign comprises:
    determining, based on which color component of the plurality of color components has a non-zero coded block flag (CBF) earlier in a scan order, a first weight for a first color component of the plurality of color components and a second weight for a second color component of the plurality of color components; and
    predicting, based on the first weight and the second weight, the sign;
  generating, for each respective color component of the plurality of color components and based on the plurality of coefficients of the joint residual block, coefficients of a respective residual block of a plurality of residual blocks; and
  reconstructing, based on the plurality of residual blocks, the block of video data.

11. The method of claim 10, wherein predicting the sign comprises:
  determining, based on the first weight and the second weight, a joint cost value of the plurality of color components; and
  predicting the sign based on the joint cost value.

12. The method of claim 11, wherein determining the joint cost value comprises determining, based on the first weight and the second weight, the joint cost value as a weighted sum of cost values of the plurality of color components.

13. The method of claim 12, wherein determining the joint cost value as the weighted sum of the cost values of the plurality of color components comprises determining the joint cost value in accordance with the following equation:

$$\text{Cost}_{joint} = \sum_{color \in S} w_{color} \cdot \text{Cost}_{color}$$

where $\text{Cost}_{joint}$ is the joint cost value, $w_{color}$ is a weight of a particular color component of the plurality of color components, S denotes a set that includes the plurality of color components, and $\text{Cost}_{color}$ is a cost value of the particular color component.

14. The method of claim 10, wherein the first color component is a Cb color component and the second color component is a Cr color component.

15. The method of claim 14, wherein the Cb color component is scanned in the scan order before the Cr color component, the method further comprising:
  responsive to determining that the Cb color component has a non-zero CBF, determining that the first weight is 1 and the second weight is 0.

16. The method of claim 14, wherein the Cb color component is scanned in the scan order before the Cr color component, the method further comprising:
  responsive to determining that the Cb color component has a zero CBF and that the Cr color component has a non-zero CBF, determining that the first weight is 0 and the second weight is 1.

17. The method of claim 14, further comprising:
  responsive to determining that the Cb color component has a non-zero CBF, determining that the first weight is 1; and
  responsive to determining that the Cr color component has a non-zero CBF, determining that the second weight is 1.

18. The method of claim 11, wherein determining the joint cost value of the plurality of color components comprises:
  determining a first joint cost value of the plurality of color components for a negative sign; and
  determining a second joint cost value of the plurality of color components for a positive sign, wherein predicting the sign of the joint residual block comprises:
  responsive to determining that the first joint cost value is less than the second joint cost value, predicting the sign to be negative; and
  responsive to determining that the second joint cost value is less than the first joint cost value, predicting the sign to be positive.

19. A device for decoding video data, the device comprising:
  a memory configured to store video data; and
  one or more processors implemented in circuitry and configured to:
    predict, based on a plurality of color components of a block of video data coded using joint coding of chroma residuals (JCCR), a sign of a coefficient of a plurality of coefficients of a joint residual block of the block of video data, wherein, to predict the sign, the one or more processors are configured to:
      determine, based on which color component of the plurality of color components has a non-zero coded block flag (CBF) earlier in a scan order, a first weight for a first color component of the plurality of color components and a second weight for a second color component of the plurality of color components; and predict, based on the first weight and the second weight, the sign;

generate, for each respective color component of the plurality of color components and based on the plurality of coefficients of the joint residual block, coefficients of a respective residual block of a plurality of residual blocks; and reconstruct, based on the plurality of residual blocks, the block of video data.

20. The device of claim 19, wherein, to predict the sign, the one or more processors are configured to:

determine, based on the first weight and the second weight, a joint cost value of the plurality of color components; and predict the sign based on the joint cost value.

21. The device of claim 20, wherein, to determine the joint cost value, the one or more processors are configured to determine, based on the first weight and the second weight, the joint cost value as a weighted sum of cost values of the plurality of color components.

22. The device of claim 19, wherein the first color component is a Cb color component and the second color component is a Cr color component.

23. The device of claim 22, wherein the Cb color component is scanned in the scan order before the Cr color component, and wherein the one or more processors are further configured to:

determine, responsive to determining that the Cb color component has a non-zero CBF, that the first weight is 1 and the second weight is 0.

24. The device of claim 22, wherein the Cb color component is scanned in the scan order before the Cr color component, and wherein the one or more processors are further configured to:

determine, responsive to determining that the Cb color component has a zero CBF and that the Cr color component has a non-zero CBF, that the first weight is 0 and the second weight is 1.

25. A device for encoding video data, the device comprising:

a memory configured to store video data; and one or more processors implemented in circuitry and configured to:

predict, based on a plurality of color components of a block of video data coded using joint coding of chroma residuals (JCCR), a sign of a coefficient of a plurality of coefficients of a joint residual block of the block of video data, wherein, to predict the sign, the one or more processors are configured to:

determine, based on which color component of the plurality of color components has a non-zero coded block flag (CBF) earlier in a scan order, a first weight for a first color component of the plurality of color components and a second weight for a second color component of the plurality of color components; and predict, based on the first weight and the second weight, the sign;

generate, for each respective color component of the plurality of color components and based on the plurality of coefficients of the joint residual block, coefficients of a respective residual block of a plurality of residual blocks; and reconstruct, based on the plurality of residual blocks, the block of video data.

26. The device of claim 25, wherein, to predict the sign, the one or more processors are configured to:

determine, based on the first weight and the second weight, a joint cost value of the plurality of color components; and predict the sign based on the joint cost value.

27. The device of claim 26, wherein, to determine the joint cost value, the one or more processors are configured to determine, based on the first weight and the second weight, the joint cost value as a weighted sum of cost values of the plurality of color components.

28. The device of claim 25, wherein the first color component is a Cb color component and the second color component is a Cr color component.

29. The device of claim 28, wherein the Cb color component is scanned in the scan order before the Cr color component, and wherein the one or more processors are further configured to:

determine, responsive to determining that the Cb color component has a non-zero CBF, that the first weight is 1 and the second weight is 0.

30. The device of claim 28, wherein the Cb color component is scanned in the scan order before the Cr color component, and wherein the one or more processors are further configured to:

determine, responsive to determining that the Cb color component has a zero CBF and that the Cr color component has a non-zero CBF, that the first weight is 0 and the second weight is 1.

31. A non-transitory computer-readable storage medium storing instructions that, when executed, cause one or more processors of a video coder to:

predict, based on a plurality of color components of a block of video data coded using joint coding of chroma residuals (JCCR), a sign of a coefficient of a plurality of coefficients of a joint residual block of the block of video data, wherein the instructions that cause the one or more processors to predict the sign comprise instructions that cause the one or more processors to:

determine, based on which color component of the plurality of color components has a non-zero coded block flag (CBF) earlier in a scan order, a first weight for a first color component of the plurality of color components and a second weight for a second color component of the plurality of color components; and predict, based on the first weight and the second weight, the sign;

generate, for each respective color component of the plurality of color components and based on the plurality of coefficients of the joint residual block, coefficients of a respective residual block of a plurality of residual blocks; and reconstruct, based on the plurality of residual blocks, the block of video data.

* * * * *